3,182,019
PROCESS FOR PREPARING PETROLEUM OIL ADDITIVES
Gordon N. Wilks, West Wickham, and Aubrey T. Langton, Milton, England, assignors to Esso Research and Engineering Company, a corporation of Delaware
No Drawing. Filed Dec. 9, 1960, Ser. No. 74,760
Claims priority, application Great Britain, Dec. 15, 1959, 42,580; Feb. 8, 1960, 4,408
10 Claims. (Cl. 252—32.7)

This invention relates to the production of oil-soluble complexes suitable as additive compounds for petroleum oils, including lubricating and fuel oils, and particularly relates to a process for preparing a complex containing an alkali or alkaline-earth metal carbonate in colloidal form.

The additive compounds of this invention impart detergent and other properties where incorporated in lubricating or fuel oils used in internal combustion engines, inhibiting the formation of varnish at high temperatures, and also impart dispersant properties to lubricating oils, inhibiting the formation of sludge and coke-like deposits at lower temperatures. The additive complexes also impart anti-oxidant properties to petroleum oils. Thus the additives of this invention are most suitable for use as motor oil or fuel additives, resulting in more economical running and a reduction in wear of internal combustion engines.

This invention consists in a process for preparing such additives, comprising dissolving an acidic sulphur-containing hydrocarbon and a phenolic compound in an inert solvent as diluent oil, adding an alkali or alkaline-earth metal base to the oil mixture in proportions less than that required to form salts with the total acidic and phenolic compounds therein, and contacting the oil mixture at elevated temperatures with carbon dioxide, whereby a colloidal metal carbonate is formed in the oil mixture, the reaction being carried out in the presence of small proportions of water.

While the mechanism of the above reaction is not known with precision, it is considered that the alkali or alkaline-earth metal base compound forms a metal phenate more rapidly than it forms a salt with the acidic sulphur-containing compound, and the $CO_2$, being more strongly acid than the phenol, takes up the phenate metal cation to form colloidal metal carbonate, leaving at least a proportion of free phenol in the reaction mixture. If a greater proportion of metal base than that required to initially react with the phenol is used, metal salts of the acid sulphur-containing hydrocarbon will be slowly formed. These in turn will be converted back to the acid product when $CO_2$ is bubbled through the oil mixture, but as the phenate reaction is much more rapid, it is preferred that the proportion of metal base which is added is not greater, and is more preferably less than that required to react with the phenol. If an excess of metal base is added, free base will be present in the reaction mixture, and at least part of the resulting metal carbonate will not be in the colloidal form.

It is a particularly preferred feature of this invention that as the alkali or alkaline-earth metal is converted to colloidal carbonate, further additions of metal base are made to the reaction mixture whereby further amounts of colloidal metal carbonate are generated, so that the total metal content of the final reaction product is greater than that contained in the initial reaction mixture. Thus a particularly simple technique is to add the metal base continuously during reaction with stoichiometrical proportions of $CO_2$. The reaction is continued until the required amount of colloidal carbonate is formed in the reaction mixture.

The sulphur-containing hydrocarbon and the phenol are dissolved in an inert solvent therefor, for instance hydrocarbons, particularly paraffinic hydrocarbons, naphthas, gas oils, lubricating oils, to form the solvent mixture with the added alkaline-earth base compound.

The function of the acidic sulphur-containing hydrocarbon is to act as a colloid stabilizer, and if it is not present, the reaction becomes erratic, and the alkali or alkaline-earth metal carbonate may go into water present in the reaction mixture to form the oil-insoluble bicarbonate with further $CO_2$. It is therefore essential that some of the sulphur-containing hydrocarbon is in the free state during and after the reaction.

The acidic sulphur-containing hydrocarbons used in the process of this invention include the reaction products of aliphatic hydrocarbons with sulphur, sulphur dichloride or other sulphur-imparting materials. The hydrocarbons include paraffins, olefines, olefine polymers, diolefines, petroleum fractions including cracked fractions, and including naphthenic fractions containing aliphatic hydrocarbons, bright stock residua, lubricating oil distillates, petroleum and paraffin waxes, e.g. cracked paraffin waxes, and also the bottoms from the fractionated products of UOP polymerization processes, particularly those having a mid-boiling point above 500° F.

It is particularly preferred however, that the acidic sulphur-containing derivatives are in fact phosphosulphurized derivatives, obtained by reacting such hydrocarbons with a phosphorus sulphide, e.g. $P_2S_5$ or a mixture of elemental phosphorus and sulphur. The preferred phosphosulphurized compounds are phosphosulphurized UOP polymer bottoms and phosphosulphurized polyolefines having a molecular weight of from 100 to 50,000, for example 200 to 20,000, particularly 250 to 1200, for example polyethylene or polypropylene. Phosphosulphurized polyisobutylene is a particularly preferred example of an acidic sulphur-containing hydrocarbon used in the process of this invention.

The phenol used in the reaction mixture includes alkyl phenols containing one or more alkyl side chains containing 5 to 30, preferably 8 to 26 carbon atoms per alkyl group, and may be poly-OH phenols containing more than one ring structure. The so-called bis phenols may be used, also acyl phenols, amino phenols, acetyl phenols and dialkyl phenols. Thus typical compounds are diphenylolpropene, 2,2-bis-(2-OH-3-tert-butyl - 5 - methylphenyl)-propane, diethylamino phenols, benzyl amino phenols, acyl aminophenols, for example N-propionyl-p-aminophenol, acetyl phenol, and their homologues. Condensation products of such phenols with aldehydes or ketones, e.g. formaldehyde and acetone, may also be used. The term phenols also includes phenol sulphides, particularly tert-amyl (or octyl) phenol sulphide.

The preferred phenols are mono-alkylated monohydroxy phenols having a molecular weight between 150 and 700. Particularly preferred are mono-alkylated phenols having a $C_8$–$C_{12}$ side-chain.

The proportion of the alkyl phenol/sulphur-containing compounds used may vary within wide limits. The actual ratio used is not critical and depends on the proportion of metal base initially added, and on the amount of colloidal metal carbonate actually formed. Thus, it is preferred that sufficient phenol be present to take up all of the metal base initially added, and sufficient sulphur-containing hydrocarbon present to promote stability to the total colloid formed, the metal content of which can be much greater than the amount present in the original. The molar ratio of initial metal base to phenol hydroxy groups is preferably not greater than 1:1, and can with advantage be less, particularly from 9:10 to 5:10. The contacting of the reaction mixture with carbon dioxide is achieved for instance by bubbling the carbon dioxide through the oil mixture at atmospheric or preferably slightly sub-atmospheric pressure at elevated temperature. It is possible to carry out the process at super-atmospheric pressure. Contacting is continued until the required proportion of colloidal metal carbonate is formed. Thus all the meal phenate need not be converted, but if a large proportion of colloidal carbonate is required, additional proportions of metal base can be added as the reaction continues.

It is also a preferred feature of the additives prepared according to this invention that the atomic ratio of metal to phosphorus in the finished product is from about 2:1 to about 23:1, particularly from 4.5:1 to 6.8:1. Additive compounds having the above ratios are particularly suitable for use in situations where silver, copper or lead components are present, and corrosion thereof is to be avoided. Such preferred ratios may be obtained by judicious mixture of additives prepared according to this invention.

It is possible to obtain molecular ratios of metal/alkyl phenol in the final reaction mixture of up to 20:1, or even more. The minimum weight ratio of colloidal stabilizer/alkyl phenol is preferably 1:5. Greater proportions of colloid stabilizer may be used if desired, but the efficiency of the process is not substantially enhanced.

The metal base can be the oxide, hydroxide, or hydroxide hydrate of an alkali or alkaline-earth metal. Calcium and barium compounds are particularly preferred, although magnesium or sodium bases can also be used, including mixtures of bases of any or all such metals. The reaction temperature is preferably between 160 and 400° F. Particularly useful compounds are prepared using barium or calcium oxide, hydroxide or hydroxide hydrate. Using barium or sodium compounds, the reaction is best carried out at temperatures within the range 230 to 300° F., but with compounds of lesser solubility, e.g. calcium or magnesium compounds the metal bases may conveniently be initially reacted in the form of a water slurry at a temperature of 160–180° F., the temperature being increased when the $CO_2$ is introduced.

Sodium hydroxide is preferably incorporated in the reaction mixtures as a concentrated aqueous solution thereof.

It is necessary that water be present during reaction. Normally it is preferred that water is present in the liquid phase, and even if the reaction is carried out at temperatures somewhat above the boiling point of water, some water usually remains in the liquid phase, providing make-up water is added. However, the reaction may be found to proceed satisfactorily in the presence of water consisting wholly or partly of steam. The water may be added to the reaction mixture, for instance, by entraining water with the $CO_2$ introduced into the reaction mixture. The water is preferably present in molar proportions at least equal to the $CO_2$ taken up by the metal base. It may be derived partly from basic hydrates used in the process.

After the required degree of reaction has been completed, the reaction mixture is filtered to obtain a clear oil solution containing the complex consisting of free phenol, sulphur-containing hydrocarbon, metal salts of the phenol, and colloidal metal carbonate. For ease of filtration, the mixture should be blown with $CO_2$ for some time after the metal compound addition has ceased. It has been found according to the process of this invention, that the amount of residual material filtered off is very small.

In preparing the additive compounds according to this invention, the following ranges of reactants may be used, to produce the compounds as hereinbefore described.

| | Parts by weight |
|---|---|
| Sulphur-containing hydrocarbon [1] | 1.5 to 24 |
| Phenolic compound | 4 to 12 |
| Diluent oil | 40 to 75 |
| Metal base (as hydroxide) | 4 to 45 |
| $CO_2$ | 2 to 10 |

[1] As fully phosphosulphurized hydrocarbon.

Oil-soluble additives prepared according to the process of this invention are preferably incorporated in lubricating oils in association with minor proportions of sulphur-containing and/or phosphorus-containing organic salts of metals of group 2B or 6A of the Periodic Classification of the Elements, whereby anti-wear properties may be donated to the oils. Particularly useful auxiliary additives are the zinc or molybdenum salts of dialkyl-dithio-phosphoric acids, e.g. such acids containing $C_3$–$C_{20}$ alkyl groups. Trialkyl or triaryl esters (or mixed alkyl/aryl esters) of phosphoric acids may also be used as auxiliary additives in lubricating oil compositions containing the additives prepared according to this invention, e.g. tricresyl phosphate or tributyl phosphate.

Specific embodiments of this invention are hereinafter described in the following examples:

ADDITIVE A 24 parts by weight of phospho-sulphurized polybutene (molecular weight 900) was dissolved in 45 parts by weight of a petroleum distillate oil of viscosity 25 SUS/210° F., and 10.4 parts by weight of a mixture of $C_8$–$C_{12}$ alkyl phenol was incorporated in the solution. The total mixture was then heated to 260° F., 3 parts of barium hydroxide pentahydrate was then added, and $CO_2$ was bubbled through the mixture until a total of 2.6 parts of $CO_2$ was contacted therewith over a period of time of two hours. During the $CO_2$ contacting a further 15 parts by weight of barium oxide pentahydrate was slowly added over the two hours, reaction taking place whereby the metal salt was taken into solution. After flow of $CO_2$ ceased, the mixture was heated to 300° F., and blown with nitrogen to remove water, and the resulting product filtered.

The final product contained 3.5% by weight of oil-soluble barium carbonate (calculated as $CO_3$). The barium/phosphorus atomic ratio was 2.15:1.

ADDITIVE B

This additive was prepared according to the process of Additive A, except that 4.8 parts by weight of the phosphosulphurized polybutene, 5 parts by weight of the alkyl phenol, 58 parts by weight of the diluent oil, 39.2 parts by weight of barium hydroxide pentahydrate and 6.8 parts of $CO_2$ were used.

The barium/phosphorus atomic ratio of the final product was 23.2:1.

ADDITIVE C

This additive was prepared according to the process of Additive A except that 14.4 parts by weight of the phosphosulphurized polybutene, 7.7 parts by weight of the alkyl phenol, 51.2 parts by weight of the diluent oil, 28.6 parts by weight of the barium hydroxide pentahydrate and 4.7 parts by weight of $CO_2$ were used.

The barium/phosphorus atomic ratio of the final product was 16.2:1.

ADDITIVE D

Additive D was a mixture of Additives A and B, in proportion to give a barium/phosphorus atomic ratio of 5.65:1.

To illustrate the advantages obtained in having an additive mixture having a metal/phosphorus ratio within the preferred range hereinbefore described, the following experiment was carried out.

2 weight percent of each of Additives A, B, C and D was added to separate portions of a mineral lubricating oil of viscosity 32 cs. at 100° F. and each was tested for anti-corrosion properties as follows:

Metal bearing test

A mixture of 2 vol. percent of water and 98 vol. percent of the lubricant composition was stirred at 2,000 r.p.m. until an emulsion had formed. A strip of electrolytic copper approximately 50 mm. x 5 mm. and a 50 mm. segment of a steel ball bearing race from an automobile anti-friction bearing were placed in the beaker containing the oil in a position such that the metals were not in contact. The beaker was covered and maintained at 100° C. for 48 hours; after which time the metal specimens were removed, washed with solvent and examined. To pass the test the copper specimen should not be badly discoloured or show deposits, slight discolouration being permitted, and the steel test piece should show no rust.

Silver corrosion test

A 500 mol. sample of the lubricant composition was maintained at 342° F. with stirring, air being passed through the oil. 23 gm. of silver was added to the oil and the oil was maintained at 342° F. for 23 hours; after which time the specimen was removed, re-weighed and the weight difference recorded. A loss of weight of below 1.5 mg. is considered as good and a loss of weight of above 1.5 mg. is considered as poor.

Copper/lead alloy corrosion test

This test was carried out under the same conditions as the silver corrosion test except that a 17 gm. specimen of the alloy was employed. A loss of below 40 mg. is considered as good and a loss of above 40 mg. is considered as poor.

The following results were obtained in the previously described tests as shown in Table I.

TABLE I

| Additive | Ba/P Atomic Ratio | Corrosion Test | | |
|---|---|---|---|---|
| | | Metal Bearing | Silver | Copper/Lead |
| A | 2.15:1 | Fail | Poor | Good |
| B | 23.2:1 | Pass | Good | Poor |
| C | 10.2:1 | | Good | Poor |
| D | 5.65:1 | Pass | Good | Good |

It will be seen from the above tests that the composition containing Additive D which is in accordance with a preferred feature of the present invention was satisfactory in each of the three corrosion tests carried out while the other compositions were not satisfactory in at least one respect.

Further additives were prepared according to this invention, substantially according to the method of Additive A as hereinbefore described, but with the following proportions of reactants as shown in Table II, all proportions being in parts by weight.

TABLE II

| Reactants | Additive | | | | | | |
|---|---|---|---|---|---|---|---|
| | E | F | G | H | J | K | L |
| $P_2S_5$ treated polybutene | 24 | 13.6 | 4.8 | 6.0 | 1.5 | 29.1 | 6.6 |
| Alkyl Phenol | 10.4 | 10.4 | 5.0 | 10.4 | 10.4 | 7.1 | 5.6 |
| Diluent Oil | 54.6 | 55.4 | 69.1 | 45.0 | 45.0 | 46.4 | 60.0 |
| $Ba(OH)_2.5H_2O$ | | 18.0 | | 18.0 | 18.0 | | |
| $Ca(OH)_2$ [1] | 5.1 | | 10.4 | | | 16.0 | |
| NaOH [2] | | | | | | | 11.5 |
| $CO_2$ | 2.7 | 2.6 | 7.1 | 2.6 | 2.6 | 9.1 | 6.3 |

[1] Added as aqueous slurry.
[2] Added as 50% NaOH solution.

A blend of an automobile lubricating oil of SAE 30 grade and 2.3% by weight of Additive A as hereinbefore described and 0.7% of zinc $C_3/C_6$ dialkyl dithiophosphate (designated Blend 1), and a similar blend but containing 3% of Additive A (designated Blend 2), were engine-tested according to standard procedures. The results are given in Table III.

TABLE III

| Engine Test | Oil | | |
|---|---|---|---|
| | Base Oil | Blend 1 | Blend 2 |
| Caterpiller [1]-L1: | | | |
|   Ring Zone Demerit | 2.20 | 0.37 | 0.03 |
|   Ring Zone Demerit (Minus No. 1 ring) | 1.91 | 0.09 | 0.01 |
|   Top Groove Fill | 15 | 1 | 0 |
| Petter [1] W-1: | | | |
|   Piston Skirt Lacquer Merit | 2.7 | 9.8 | 9.4 |
|   Bearing weight loss (mg.) | 1,500 | 5.2 | 7.0 |

[1] The words "Caterpiller" and "Petter" are registered trademarks.

Table III shows the substantial benefits to be obtained by the use in lubricating oils of additives of the present invention together with an anti-wear additive.

What is claimed is:

1. A process for preparing an additive for petroleum oils which comprises the steps of treating a mixture of from 1.5 to 24 parts by weight of a phosphosulfurized aliphatic hydrocarbon, 4 to 12 parts by weight of an alkyl phenol having a molecular weight in the range of 150 to 700, and 40 to 75 parts by weight of a paraffinic hydrocarbon diluent, with a metal base selected from the group consisting of the oxides, hydroxides, and hydrated hydroxides of alkali metals and alkaline earth metals, in an amount of said metal base less than that required to completely react with all the phenolic hydroxy groups and within a mole ratio of said metal base to said phenolic hydroxy groups of 0.5 to 1.0 and 0.9 to 1.0, at a reaction temperature in the range of 160° to 400° F., and thereafter passing carbon dioxide through the mixture at said reaction temperature while adding substantially stoichiometrical proportions of additional metal base until from 4 to 45 parts by weight of metal base (calculated as the hydroxide) and from 2 to 10 parts by weight of carbon dioxide have been added, water being present during the reaction in an amount at least equal to the carbon dioxide present, on a molar basis.

2. Process as defined by claim 1, wherein the total amount of metal incorporated into the additive provides an atomic ratio of metal to phosphorus in the finished product of about 2:1 to about 23:1.

3. Process as defined by claim 1, wherein said phosphosulfurized hydrocarbon is a phosphosulfurized polyolefin having a molecular weight in the range of 100 to 50,000.

4. Process as defined by claim 1, wherein said phosphosulfurized hydrocarbon is a phosphosulfurized polyisobutylene of from 200 to 20,000 molecular weight.

5. Process as defined by claim 1, wherein said metal base comprises barium hydroxide pentahydrate.

6. Process as defined by claim 1, wherein said metal base is a compound of barium, and the total amount of barium incorporated into the additive provides an atomic ratio of barium to phosphorus in the range of from about 4.5 to 1 to about 6.8 to 1.

7. Process as defined by claim 1, wherein said metal base is a compound of sodium and the reaction is conducted at a temperature in the range of 230° to 300° F.

8. Process as defined by claim 1, wherein said metal base is a compound of barium and the reaction is conducted at a temperature in the range of 230° to 300° F.

9. An additive complex containing colloidal metal carbonate and adapted for use as an additive for petroleum oils which consists essentially of the product obtained by treating a mixture of from 1.5 to 24 parts by weight of a phosphosulfurized aliphatic hydrocarbon, 4 to 12 parts by weight of an alkyl phenol having a molecular weight in the range of 150 to 700, and 40 to 75 parts by weight of a paraffinic hydrocarbon diluent, with a metal base selected from the group consisting of the oxides, hydroxides, and hydrated hydroxides of alkali metals and alkaline earth metals, in an amount of said metal base less than required to completely react with all of the phenolic hydroxy groups and within a mole ratio of said metal base to said phenolic hydroxy groups of about 0.5 to 1.0 and 0.9 to 1.0, at a reaction temperature in the range of 160° to 400° F., and thereafter passing carbon dioxide through the mixture at said reaction temperature while adding substantially stoichiometrical proportions of additional metal base until from 4 to 45 parts by weight of metal base (calculated as the hydroxide) and from 2 to 10 parts by weight of carbon dioxide have been added, water being present during the reaction in an amount at least equal to the carbon dioxide present, on a molar basis.

10. A hydrocarbon oil composition comprising a major proportion of a hydrocarbon oil selected from the group consisting of lubricating oils and fuel oils and a detergency imparting amount of the additive complex of claim 9.

References Cited by the Examiner

UNITED STATES PATENTS

| | | | |
|---|---|---|---|
| 2,369,632 | 2/45 | Cook et al. | 252—32.7 |
| 2,767,209 | 11/52 | Asseff et al. | 260—504 |
| 2,865,956 | 12/58 | Ellis et al. | 252—33 |
| 2,906,709 | 9/59 | Lemmon et al. | 252—32.7 |
| 2,915,465 | 12/59 | Anderson et al. | 252—33.4 |
| 2,921,901 | 1/60 | Karll et al. | 252—32.7 |
| 3,003,959 | 10/61 | Wilson et al. | 252—32.7 |

FOREIGN PATENTS

| | | |
|---|---|---|
| 570,814 | 2/59 | Canada. |
| 574,161 | 4/59 | Canada. |
| 786,167 | 11/57 | Great Britain. |

DANIEL E. WYMAN, *Primary Examiner.*

JULIUS GREENWALD, *Examiner.*